UNITED STATES PATENT OFFICE.

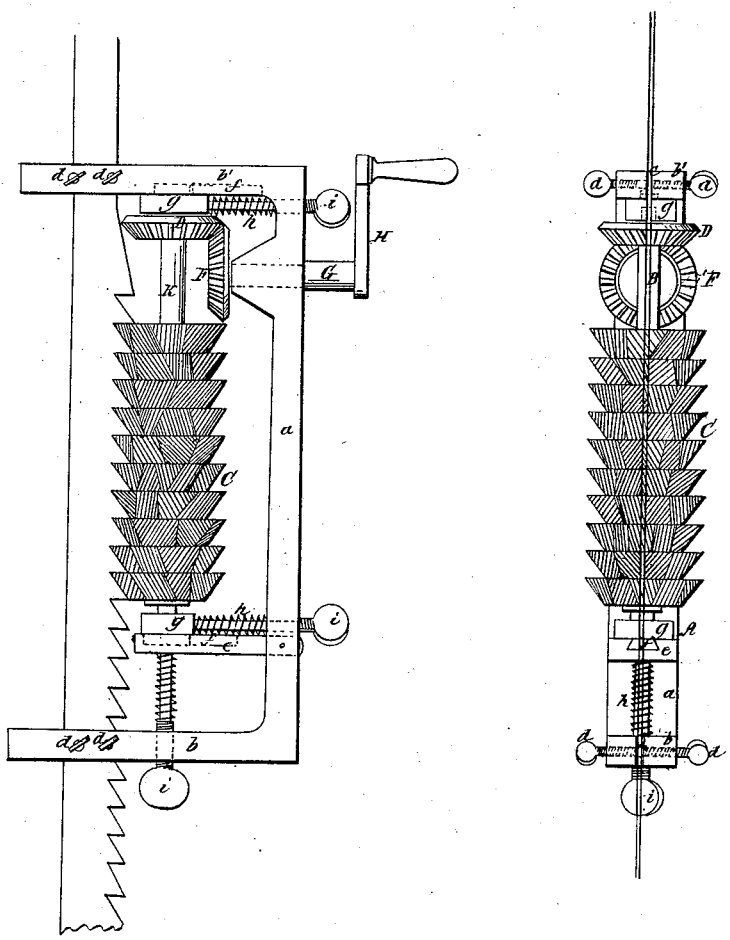

SOLON WOOD, OF WHITEPINE, PENNSYLVANIA.

SAW-FILER.

Specification of Letters Patent No. 24,172, dated May 24, 1859.

*To all whom it may concern:*

Be it known that I, SOLON WOOD, of Whitepine, in the county of Lycoming and State of Pennsylvania, have invented a new and Improved Machine for Filing Saws in the Gate; and I do hereby declare that the following is a full, clear, and exact description of the same, reference being had to the annexed drawings, making a part of this specification, in which—

Figure 1, is a front elevation of the machine. Fig. 2, is a side elevation of the same showing its application to a saw.

Similar letters of reference in the two views indicate corresponding parts of my invention.

This invention consists in arranging a series of revolving cutters which correspond to the shape of the saw teeth on an arbor which has its bearings in a frame which can readily be attached to the saw, said arbor being so arranged that it can be rotated by means of bevel wheels and that the cutters are kept up to the work by spiral springs the strain of which can be regulated by means of set screws.

To enable others skilled in the art to fully understand, use and construct my invention I will proceed to describe it.

A, is a frame which is constructed of cast iron or other suitable material, and which consists of a bar *a*, with two arms *b*, *b'*, and the latter are provided with slots *c*, wide enough to receive all sorts of saw-blades, and thumb screws *d*, serve to fasten the same firmly to the required spot of the saw. An additional arm *e*, is hinged to the bar *a*, and this arm as well as the lower arm *b'*, of the frame A, is provided with a dove-tailed recess *f*, in which pieces *g*, slide to and from the saw, and these pieces form the bearings for the arbor B, to which the cutters C, are attached, and the arbor B, is so arranged that it has a small motion in a longitudinal direction in the sockets formed by the pieces *g*. The additional arm *e*, and the sliding pieces *g*, are subjected to the action of spiral springs *h*, the strain of which can be regulated by set screws *i*, and attached to the upper end of the arbor B, is a bevel wheel D, which gears into another bevel wheel F, which is fastened to a shaft G, which has its bearing in the bar *a*, in a place where the same is strengthened by a boss *j*. The shaft G, is rotated by means of a crank H.

The operation is as folows:—The frame A, is fastened to the saw blade by means of the thumb screws *d*, so that the cutters C, fit into the saw teeth, as clearly represented in Fig. 2. By rotating the arbor B, the cutters begin to act and by the action of the springs *h*, the cutters are constantly kept up to the work so that the teeth are perfectly sharpened on their horizontal part as well as on their inclined part and the power of the springs is regulated by means of the set screws *i*, according to the thickness of the saw blade or according to the quantity to be filed.

What I claim as new and desire to secure by Letters Patent, is,

1. The arrangement of the cutters C, on an arbor B, the bearings of which are so arranged that the cutters are subjected to the action of adjustable spiral springs or their equivalent, substantially in the manner and for the purpose herein specified.

2. And I also claim the additional arm *e*, which is hinged to the bar *a*, in combination with the sliding pieces *g*, for the purpose of allowing the cutters to follow the action of the springs *h*, in two directions, substantially as herein described.

SOLON WOOD.

Witnesses:
JAS. A. WILLIAMSON,
JOHN CLINE.